United States Patent
Kelley et al.

(10) Patent No.: US 8,562,888 B2
(45) Date of Patent: Oct. 22, 2013

(54) PORTABLE SEALANT DISPENSE SYSTEM

(75) Inventors: James A. Kelley, Benbrook, TX (US); Michael B. Weaver, Fort Worth, TX (US); David Schultz, Cleburne, TX (US); Jason O'Rustus LeFever, Midland, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 412 days.

(21) Appl. No.: 12/512,238

(22) Filed: Jul. 30, 2009

(65) Prior Publication Data
US 2011/0024943 A1 Feb. 3, 2011

(51) Int. Cl.
*B29C 45/14* (2006.01)

(52) U.S. Cl.
USPC .............................. 264/263; 249/98

(58) Field of Classification Search
None
See application file for complete search history.

(56) References Cited

U.S. PATENT DOCUMENTS

| | | | |
|---|---|---|---|
| 2,710,113 A * | 6/1955 | Pritchard | 220/681 |
| 2,838,210 A | 6/1958 | Detrie et al. | |
| 3,350,774 A | 11/1967 | Bridges, Sr. | |
| 3,494,325 A | 2/1970 | Magee | |
| 3,813,012 A | 5/1974 | Laird | |
| 3,907,442 A | 9/1975 | Reid | |
| 3,980,209 A | 9/1976 | Collar | |
| 4,096,973 A | 6/1978 | Checko | |
| 4,382,049 A * | 5/1983 | Hofmeister et al. | 264/40.1 |
| 4,404,054 A | 9/1983 | Dickson et al. | |
| 4,635,827 A * | 1/1987 | Roedig | 222/160 |
| 4,786,060 A | 11/1988 | Davis | |
| 4,858,172 A | 8/1989 | Stern | |
| 4,905,931 A * | 3/1990 | Covey | 244/1 A |
| 4,971,745 A | 11/1990 | Ferenc et al. | |
| 5,322,381 A * | 6/1994 | Argo, II | 401/9 |
| 5,647,111 A | 7/1997 | Zienkiewicz et al. | |
| 5,666,325 A | 9/1997 | Belser et al. | |
| 6,001,181 A | 12/1999 | Bullen | |
| 2007/0180674 A1 | 8/2007 | Morden et al. | |
| 2008/0134971 A1 | 6/2008 | Bradley | |

* cited by examiner

*Primary Examiner* — Edmund H. Lee
(74) *Attorney, Agent, or Firm* — Bracewell & Giuliani LLP

(57) ABSTRACT

A system and method for dispensing a sealant over aircraft fasteners secured to a surface in the aircraft. The system includes a nozzle tip having a shroud configured for placement over the fasteners. Sealant is metered to the shroud via an orifice within the nozzle tip. The shroud is sized to leave a space between it and the fastener to control the amount of sealant applied to the fastener upper surface and along the interface between the fastener and aircraft surface. Pressurized fluid urges the sealant through the orifice.

11 Claims, 6 Drawing Sheets

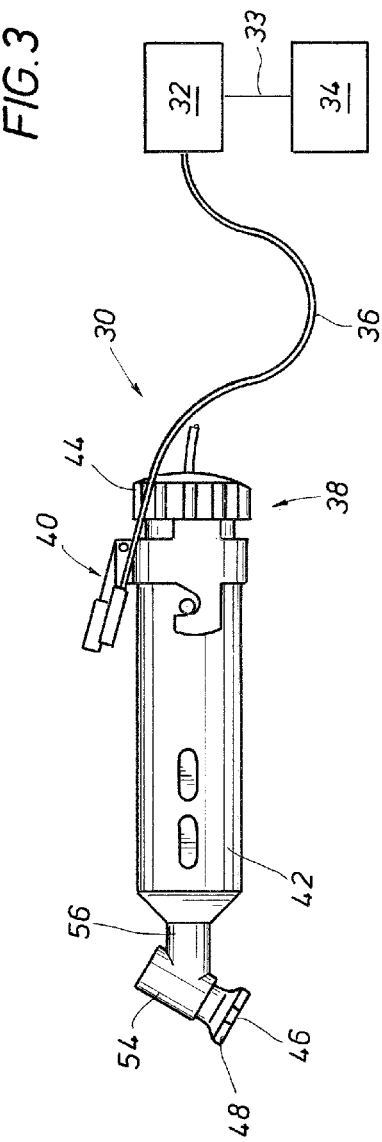
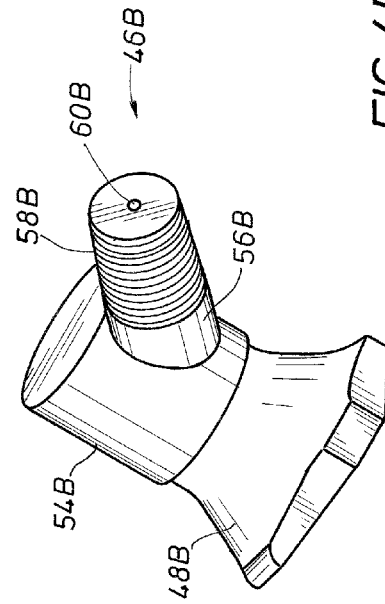
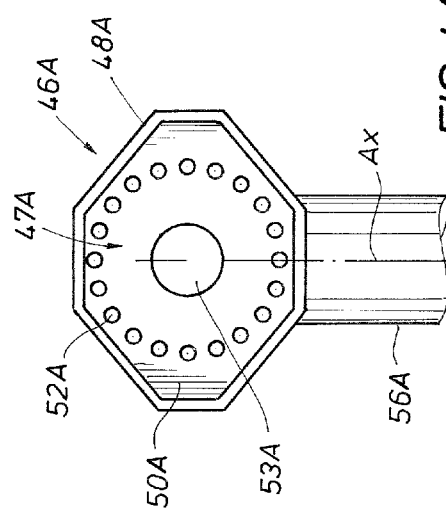
FIG. 3
FIG. 4A
FIG. 4B

US 8,562,888 B2

PORTABLE SEALANT DISPENSE SYSTEM

BACKGROUND

1. Field of Invention

The present disclosure relates generally to a nozzle for dispensing sealant on aircraft fasteners. More specifically, the present disclosure concerns nozzles adapted to enclose an exposed fastener head and meter an amount of sealant over the fastener head.

2. Description of Prior Art

Aircraft fuel tanks are typically assembled by fastening together sheets of metal or composite material. Fastening techniques include adhesive compounds, welding, and rivets. Riveting pierces the sheets being fastened thus creating a potential fluid leakage path along the rivet. To prevent leakage across the rivets, a sealant is generally applied along the interface between a fastener head and the exterior of the fuel tank. Referring now to FIG. 1A, a prior art example of a fastener 14 is shown attached to an upper fastened member 10. An interface 17 defines the fastener 14 to upper fastened member 10 contact periphery. Shown in sectional view in FIG. 1B, the fastener 14 includes a rounded head 16 set atop the upper fastened member 10. A shaft 18 depends from the head 16 through the upper fastened member 10 and into a lower fastened member 12. FIG. 1C illustrates in a side sectional view sealant 20 having been applied over the fastener head 16. The sealant 20 encompasses the interface 17 and extends past the interface 17 on the entire fastener 14 periphery.

FIGS. 2A through 2C illustrate a fastener 14A that includes a dome 19 projecting upward from an elliptically shaped base assembly 15. The base assembly 15 shown is mounted on the upper fastened member 10 with rivets 16A. As shown in side sectional view in FIG. 2B, the interface between the fastener 14A and upper fastened member 10 is defined by the outer periphery of the base assembly 15 adjacent the upper fastened member 10. Thus, sealant 20 (FIG. 2C) shown applied atop the fastener 14A extends along the outer periphery of the base assembly 15, thereby encompassing the interface 17A between the fastener 14A and upper fastened member 10.

Current techniques for applying sealant 20 to fasteners 14, 14A are typically manual such as brushing sealant onto the fastener or using a dispenser, with or without a metered supply of sealant 20. These current techniques can have results that vary with personnel applying the sealant and between applications performed by the same individual. These methods are also time consuming and often lead to an excess amount of sealant applied to the particular fastener 14, 14A. Since an aircraft can include a multiplicity of fasteners, the additive effect of excess sealant can unnecessarily increase overall aircraft weight.

SUMMARY OF INVENTION

A system and method for dispensing a sealant over aircraft fasteners secured to a surface in the aircraft. The system includes a nozzle tip having a shroud configured for placement over the fasteners. Sealant is metered to the shroud via an orifice within the nozzle tip. The shroud is sized to leave a space between it and the fastener to control the amount of sealant applied to the fastener upper surface and along the interface between the fastener and aircraft surface. Pressurized fluid urges the sealant through the orifice.

BRIEF DESCRIPTION OF DRAWINGS

Some of the features and benefits of the present invention having been stated, others will become apparent as the description proceeds when taken in conjunction with the accompanying drawings, in which:

FIG. 3 is a side partially schematic view of a dispensing system for dispensing sealant to aircraft fasteners.

FIGS. 4A through 4F depict in perspective view various embodiments of nozzle tips for use with the dispenser of FIG. 3.

Figure 1A:
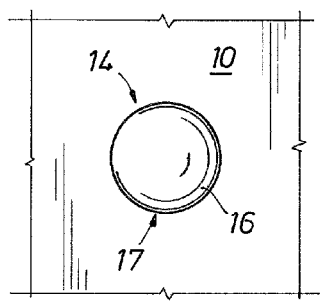
FIGS. 1A and 2A are overhead views of prior art fastening members used in aircraft construction.
Figure 1B:
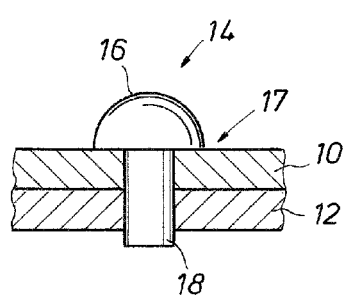
FIGS. 1B and 2B are respective side partial sectional views of the fastening members of FIGS. 1A and 2A.
Figure 1C:
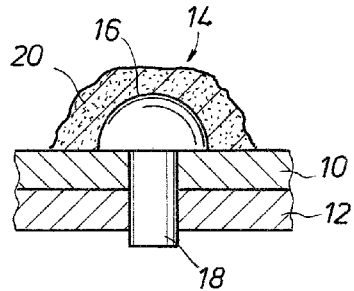
FIGS. 1C and 2C are respective side sectional views of the fasteners of FIGS. 1B and 2B with applied sealant.
Figure 2A:
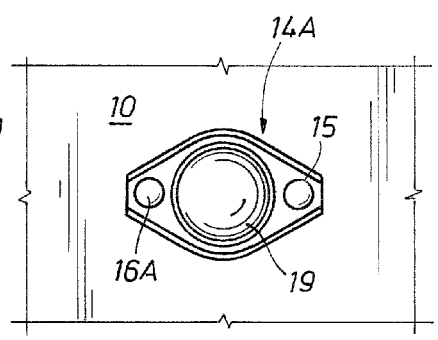
Figure 2B:
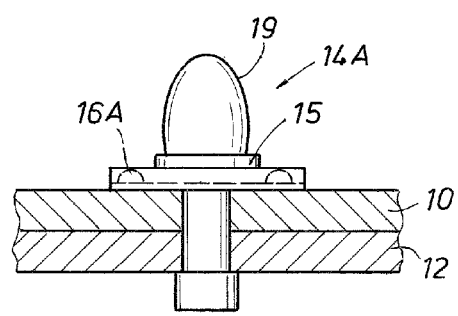
Figure 2C:
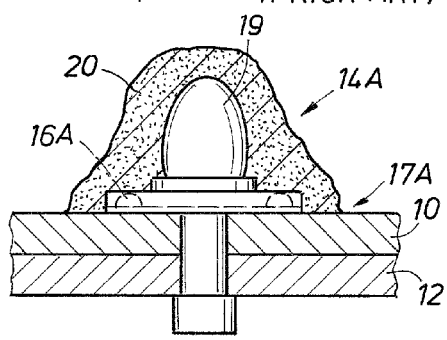

It will be understood the improvement described herein is not limited to the embodiments provided. On the contrary, the present disclosure is intended to cover all alternatives, modifications, and equivalents, as may be included within the spirit and scope of the improvement as defined by the appended claims.

DETAILED DESCRIPTION OF INVENTION

The improvement(s) of the present disclosure will now be described more fully hereinafter with reference to the accompanying drawings in which disclosed embodiments are shown. The disclosed improvement(s) may, however, be embodied in many different forms and should not be construed as limited to the illustrated embodiments set forth herein; rather, these embodiments are provided so that this disclosure will be through and complete, and will fully convey the scope of the disclosure to those skilled in the art. Like numbers refer to like elements throughout.

It is to be understood that the improvement(s) described herein is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation. Accordingly, applicants' improvements) is therefore to be limited only by the scope of the appended claims.

An example of a sealant dispensing system 30 is shown in a side partially schematic view in FIG. 3. The sealant dispensing system 30 includes a pressurized fluid supply 32 operatively coupled with a controller 34. Although the controller is shown attached or connected to the fluid supply 32 via a line 33, the controller 34 may be integral with the pressurized fluid supply 32. In one example, the pressurized fluid supply provides a pressurized gas, such as air or nitrogen, through fluid supply line 36 to a dispenser 38. The dispenser 38 of FIG. 3 includes an activator switch 40 for selectively providing fluid communication to the dispenser 38 from the pressurized fluid source 32. The dispenser 38 further includes an outer cylindrical housing 42 in which a supply of sealant (not shown) is stored. The sealant may be obtained in cylindrical cartridges, which are insertable into the housing 42 by removing an end cap 44. An example of a suitable cartridge is a Semco cartridge which is available from PPG Industries, One PPG Place, Pittsburgh, Pa. 15272.

The dispensing system 30 of FIG. 3 further includes a nozzle tip 46 shown attached to a sealant tube at the end of the housing 42 opposite the end cap 44. The nozzle tip 46 as illustrated includes an annular cylindrical housing 54 with an annular canopy 48 coaxially affixed on an end of the housing 54. Also included with the nozzle tip 46 is a cylindrical nozzle inlet 56 that depends laterally from a side of the housing 54 and oblique to the housing 54 axis. The nozzle inlet 56 connects to a discharge end of the sealant tube opposite its connection to the housing 54.

Figure 4C:
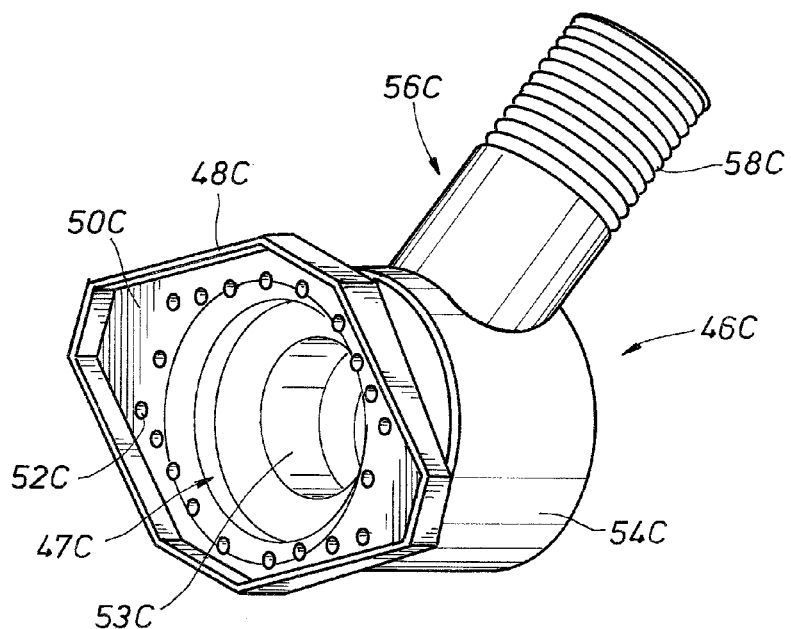

Examples of nozzle tips 46 suitable for use with the dispensing system 30 are provided in perspective views in FIGS. 4A through 4F. With reference now to FIG. 4A, an example of a nozzle tip 46 is provided in a perspective view and facing an open end of the canopy 48A. In this example, the canopy 48A outer periphery is octagonal. The canopy 48A sides that are oblique to the nozzle inlet axis $A_X$ are elongated, thereby forming an elliptically-shaped periphery. The canopy 48A projects forward from a canopy base 50A, thereby defining cavity or an enclosed space 47A within the canopy 48A. The canopy base 50A provides a barrier between the canopy 48A opening and the nozzle inlet 56. Applicator ports 52A are shown formed through the canopy base 50A, thereby providing fluid communication between the nozzle inlet 56A and the space 47A defined by the canopy 48A. The applicator ports 52A of FIG. 4A are arranged along a path, a portion of which runs adjacent to the canopy 48A walls. A domed recess 53A is shown formed in approximately the mid portion of the canopy base 50A. In one example of use, the domed reservoir 53A is adapted to receive the head portion of a fastener therein.

A perspective view of a nozzle tip 46B is provided in FIG. 4B. In this example, the nozzle inlet 56B is shown having threads 58B circumscribing its outer surface. Also provided on the nozzle inlet 56B is an orifice 60B and sized for allowing sealant to enter into the nozzle tip 46B from the dispenser 38. Sizing of the orifice 60B can be dependent upon the type of sealant to be used based on sealant properties as well as particular applications and operating conditions.

Referring now to FIG. 4C, an example of a nozzle tip 46C is shown in a perspective view. The nozzle tip 46C includes a cylindrical body 54C having a nozzle inlet 56C depending from a side of the body 54C and angled oblique to the body 54C axis. Coaxially with the body 54C is an attached canopy 48C circumscribing a recessed canopy base 50C. The canopy 48C outer walls extend away from the body 54C to define a space 47C within the canopy 48C. Applicator ports 52C are shown formed through the canopy base 50C that allow for fluid communication between the inside of the body 54C and the canopy space 47C. An optional domed recess 53C is shown formed in the mid portion of the canopy base 50C.

Figure 4D:
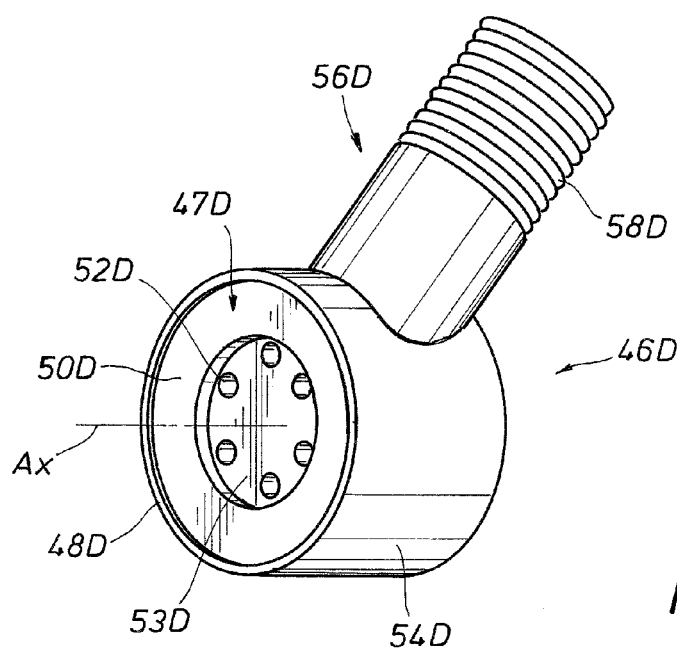

An alternative embodiment of a nozzle tip 46D is provided in a perspective view in FIG. 4D. In this embodiment, the canopy 48D shape is substantially the same as the housing 54D. Thus, the canopy 48D outer periphery is circular rather than the pseudo-elliptical shape of FIG. 4C. The canopy base 50D disposed within the walls of the canopy 48D is recessed inwards towards the housing 54D, thereby defining a space 47D circumscribed by the canopy 48D and bounded by the canopy base 50D. In this embodiment, the applicator ports 52D are shown formed within a recess 53D in the mid portion of the canopy base 50D. In this example, sealant flowing from the ports 52D flows first onto the fastener head or mid-portion then into the space 47D defined by the canopy 48D and canopy base 50D. This differs from the operation of the nozzle tip 46C of FIG. 4C, wherein sealant flowing through the applicator ports 52C is directed at or around an interface between a fastener and a fastened member, and then the sealant flows radially inward to fill the space 47C defined by the canopy 48C.

Figure 4E:
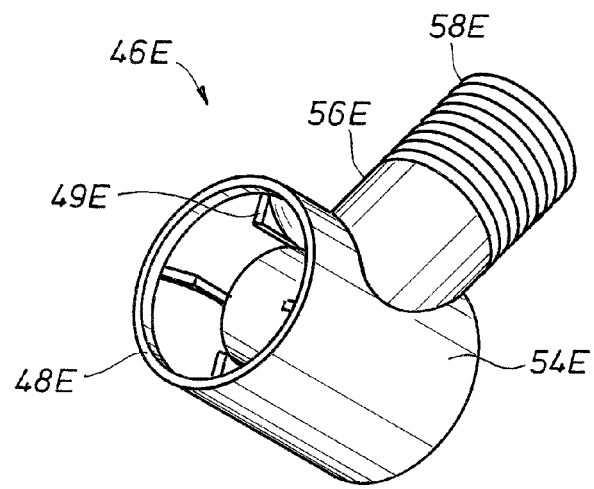

Another example of a nozzle tip 46E is shown in a perspective view in FIG. 4E. In this example, the canopy 48E includes walls that are extensions of the housing 54E. Also in this example are fins 49E radially aligned with the housing 54E axis and disposed at various points around the circumference of the nozzle tip 46E opening. A canopy base is not included in this example, but instead sealant can flow freely from the inlet 56E through the body 54E and out of the nozzle tip 46E opening. The fins 49E may be configured for placement on the outer periphery of a fastener, thereby aligning the nozzle tip 46E so a uniform amount of sealant may be placed over the fastener.

Figure 4F:
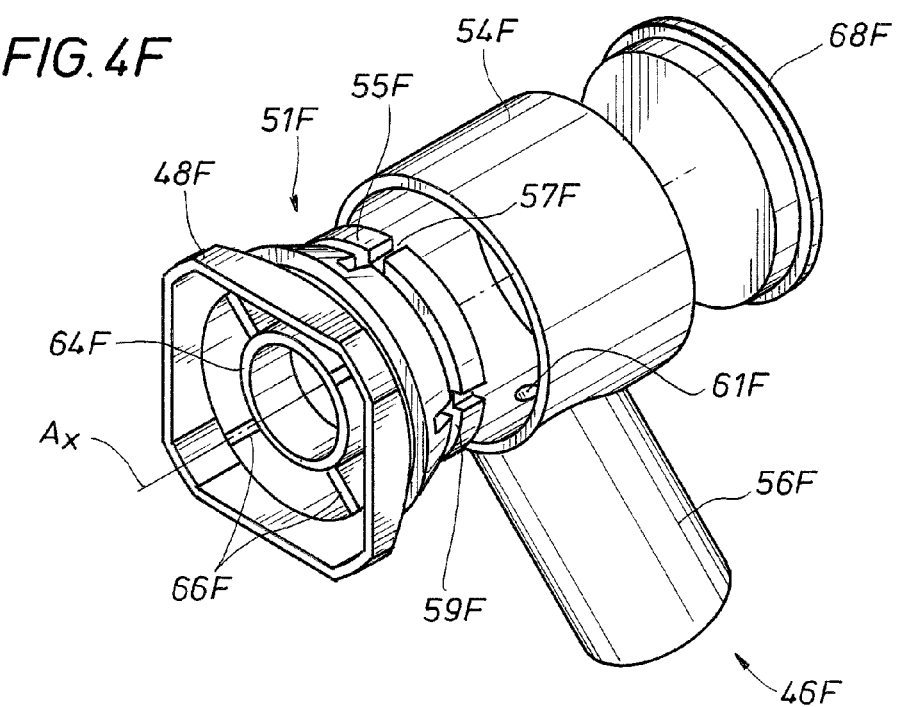

In FIG. 4F, an example of a nozzle tip 46F is shown in a perspective and partially exploded view. In this example, an annular housing 54F has a cylindrical nozzle tip inlet 56F attached to its side and at an angle to its axis $A_X$. An annular applicator assembly 51F is shown adapted for coupling with an open side of the body 54F. On one side of the assembly 51F, a ring-like insert 55F depends inward for insertion into the housing 54F. Slots 57F are shown provided on the insert 55F outer surface at locations around its circumference. A groove 59F circumscribes the insert 55F and intersecting the slots 57F. When inserted within the housing 54F, the groove 59F registers with an exit orifice 61F shown provided through the housing and allowing fluid communication between the housing and the nozzle inlet 56F. Thus, sealant flowing through the nozzle inlet 56F and exiting the exit orifice 61F enters the groove 59F, makes its way to the slots 57F and into the confines of the housing 54F. The assembly 51F of FIG. 4F is rotatable with respect to the body 54F. Thus rotating the assembly 51F can avoid an interference between the dispenser 38 and an immovable object, if the fastener head requires a particular nozzle tip 46F orientation.

A canopy 48F having a square-like outer periphery is provided on the side of the applicator assembly 51F opposite the insert 55F. Provided within the enclosure formed by the canopy 48F is a canopy ring 64F circumscribing the housing 54F axis $A_X$. Ring supports 66F extend from the canopy ring 64F outer circumference and attach within the inner surface of the canopy 48F. In one example of use, the canopy ring 64F is configured for placement on a fastener head when applying sealant onto an aircraft fastener. A circular rear plug 68F is shown proximate the side of the housing 54F opposite where it receives the applicator assembly 51F. Attaching the rear plug 68F thereby forms an enclosed space within the housing 54F to force sealant therein out through the exit path formed by the canopy 48F for sealing the interface around an aircraft fastener and fastened member.

Figure 5A:
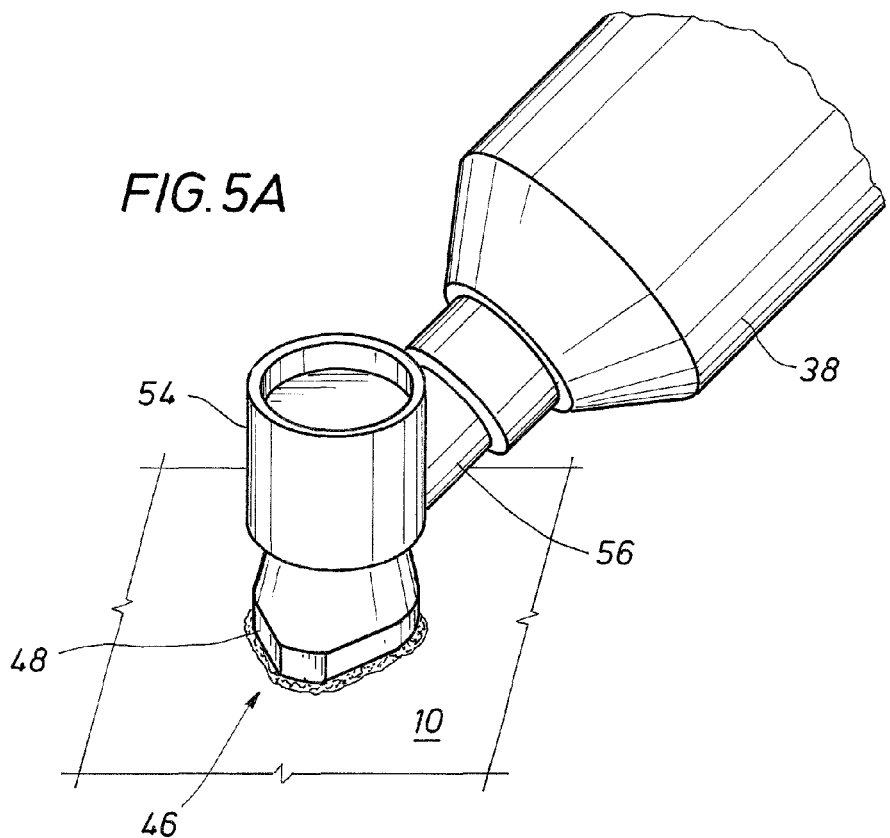
FIG. 5A is a side perspective view of a dispenser and nozzle tip applying sealant to a fastener.
Figure 5B:
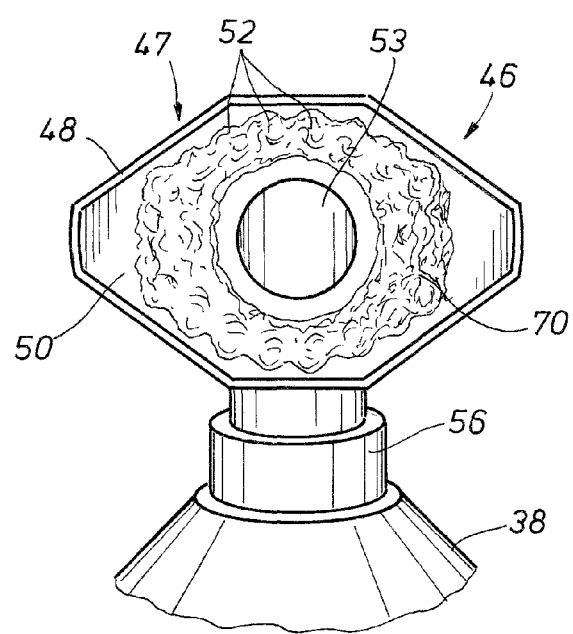
FIG. 5B is a frontal view of an opening of a nozzle tip having sealant.

In FIG. 5A, a side perspective view of the dispenser 38 and nozzle tip 46 of FIG. 3 is shown applying sealant to a fastener coupled to an upper fastened member 10. FIG. 5B provides a front view of sealant being urged outward from the applicator ports 52 of a nozzle tip 46. As described above, placing the nozzle tip 46 over a fastener encloses the space adjacent in covering the interface between an aircraft fastener and the fastened member to which it is coupled. Selectively applying the pressurized fluid to the supply of sealant forces the sealant from the dispenser and into the nozzle tip 46. Using the same nozzle tip to apply sealant to multiple fasteners controls the amount of sealant applied to each fastener. Filling with sealant the space around the interface dispenses a sufficient amount of sealant for sealing around the fastener and avoids application of excess sealant, thereby reducing total mass of applied sealant. Optionally, the controller 34 (FIG. 3) can be configured to selectively apply an amount of pressurized fluid so the amount of sealant urged from the dispenser 38 fills the space 47 in the canopy 48.

The nozzle tip 46 and its components may be foamed from the same or different materials. Example materials include elastomeric compounds, metals, composites, plastics, synthetic plastics, semi-synthetic plastics, polyamides, polymers, such as but not limited to thermoplastic polymers, polycarbonates, polystyrene, polyvinylchloride, polyethylene (low and high density), polypropylene, polyfluoroethylene, polytetrafluoroethylene, polyethylene terephthalate, combinations thereof and the like. In one example, an elastomeric seal (not shown) is provided on the forward facing end of the shroud 48 for sealing around the shroud 48 to prevent sealant from leaking within the space 47.

Figure 6A:
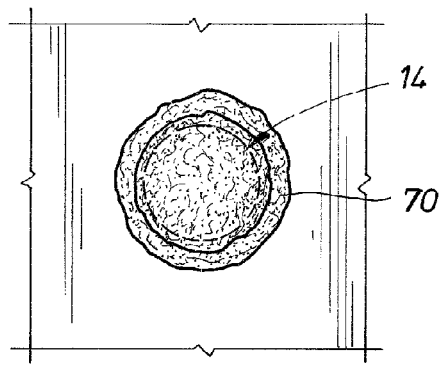
FIGS. 6A and 7A illustrate overhead views of fasteners having sealant applied using a system described herein.
Figure 6B:
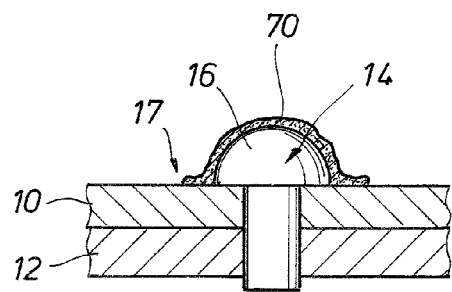
FIGS. 6B and 7B respectively are side sectional views of the fasteners with applied sealant of FIGS. 6A and 7A.
Figure 7A:
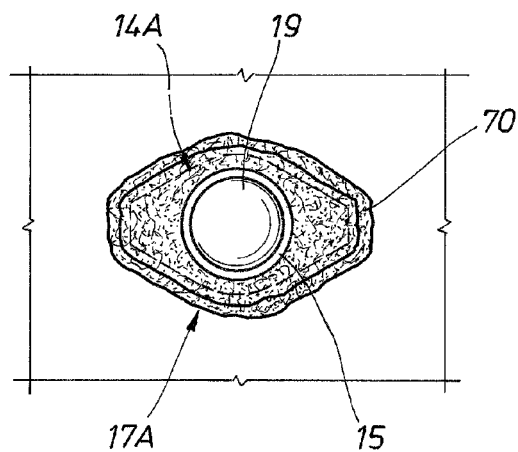
Figure 7B:
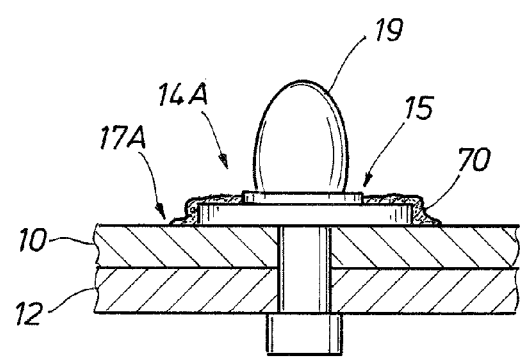

FIG. 6A is an overhead view of an example of a fastener 14 having sealant 70 applied using the technique and system described herein. FIG. 6B is a side sectional view depicting a bead of sealant 70 applied over the fastener of FIG. 6A. The sealant 70 in FIG. 6B covers the interface 17 between the fastener head 16 and upper fastened member 10. This prevents a leakage of fluid from underneath the lower fastened member 12 up the fastener 14 and past the interface 17. Shown in an overhead view in FIG. 7A is an alternate fastener 14A having a base 15 and an upwardly projecting dome portion 19. Sealant 70 is shown applied on its base 15 and along its outer periphery. FIG. 7B illustrates the fastener 14A of FIG. 7A in a side sectional view and depicts the dome portion 19 and upper portion of the base 15 are substantially free of applied sealant. Instead, the sealant 70 is applied primarily along the interface 17A. As noted above, eliminating the application of excess sealant has a significant advantage with regard to weight savings.

The method described herein clearly provides a significant time savings for dispensing sealant to fasteners. In one example of use, using the system for and method of application described, herein, the time to apply sealant to a series of fasteners was reduced by almost 75% over current methods. In another example the application time was reduced by about 82%. Moreover, use the present system and method provided weight reductions of 34% and 36% over current methods.

The present system and method described herein, therefore, is well adapted to carry out the objects and attain the ends and advantages mentioned, as well as others inherent therein. While a presently preferred embodiment has been given for purposes of disclosure, numerous changes exist in the details of procedures for accomplishing the desired results. The system and method described herein can be used in applying a flowable substance in any application; such as but not limited to vessel fasteners, vehicle fasteners, industrial fasteners, and along any interface. These and other similar modifications will readily suggest themselves to those skilled in the art, and are intended to be encompassed within the spirit of the present disclosure and the scope of the appended claims.

What is claimed is:

1. A method of applying a flowable substance to a fastener coupled to a fastened member, the method comprising:
   a. providing a sealant dispenser with an attached nozzle tip that is in fluid communication with a supply of sealant, the nozzle tip having an opening adapted to define the space over an interface between a fastener and a fastened member when placed on the fastened member above the fastener and placing the nozzle tip over the fastener, enclosing the space over the interface between the fastener and the fastened member so that at least a portion of a fastener head of the fastener extends outside of the space; and
   b. dispensing sealant to the nozzle tip from the supply of sealant, covering the interface between the fastener and the fastened member by filling the space with a flowable substance, the at least portion of a fastener head remaining devoid of the flowable substance.

2. The method of claim 1, wherein the flowable substance comprises a sealant and the fastener is an aircraft fastener.

3. The method of claim 1,
   wherein the step of providing a sealant dispenser with an attached nozzle tip that is in fluid communication with a supply of sealant comprises providing the sealant dispenser, a supply of pressurized fluid in selective communication with the dispenser, a controller for controlling the supply of pressurized fluid, and an activation switch for selectively communication the pressurized fluid with the dispenser; and
   wherein the controller is adapted to meter the amount of pressurized fluid to the dispenser so that sealant is dispensed from the dispenser in an amount substantially equal to the amount for filling the space.

4. The method of claim 1, wherein the portion of the nozzle tip having the opening is rotatable with respect to the remaining portions of the nozzle tip, the method further comprising:
   rotating the remaining portions of the nozzle tip with respect to the portion having the opening while dispensing sealant through the nozzle tip to the space to avoid an interference between the dispenser and an immovable object.

5. The method of claim 1, further comprising metering an amount of pressurized fluid to thereby control the amount of flowable substance flowing into the space in an amount substantially equal to the space.

6. The method of claim 1, further comprising repeating steps (a) and (b) on a second fastener.

7. The method of claim 1, wherein the second fastener has a different size and/or shape than the fastener of claim 1, the method further comprising providing a second nozzle tip in fluid communication with a supply of sealant and an opening adapted to form a space between the opening and the interface and placing the second nozzle tip over the second fastener.

8. The method of claim 1, wherein the fastener fastens a portion of an aircraft fuel tank.

9. The method of claim 1, further comprising the step of blocking flow of the flowable substance to the portion of the fastener head extending outside the space.

10. The method of claim 1, wherein the filling of the space is performed by first directing the flowable substance to the interface.

11. A method of sealing an interface between an aircraft fastener and a fastened member, the method comprising:
    a. providing a sealant dispenser comprising an amount of sealant, an attached nozzle with a canopy that defines an enclosure having an open end, an inner surface, a face circumscribing the open end, and a cavity defined between the inner surface and open end;
    b. placing the enclosure open end over the fastener so that the face contacts a surface of the fastened member and a fastener head of the fastener projects into the cavity to define a space over the interface, the step of placing including positioning inner surface portions of the enclosure in contact with portions of the fastener head, blocking flow of sealant to substantial portions thereof when sealant is dispensed;

c. forming a seal between the face and surface of the fastened member;
d. flowing some of the amount of sealant from the dispenser to the nozzle;
e. metering the amount of sealant flowing to the nozzle to fill the space with sealant thereby sealing the interface; and
f. using a controller to meter an amount of pressurized fluid to thereby control the amount of sealant flowing into the enclosure having a volume substantially the same as the volume of the space.

\* \* \* \* \*